(12) United States Patent
Fiske et al.

(10) Patent No.: US 10,146,470 B2
(45) Date of Patent: *Dec. 4, 2018

(54) SERVER BASED DISASTER RECOVERY BY MAKING USE OF DUAL WRITE RESPONSES

(71) Applicant: International Business Machines Corporation, Armonk, NY (US)

(72) Inventors: Rahul M. Fiske, Pune (IN); Shrikant V. Karve, Pune (IN); Sarvesh S. Patel, Maharashtra (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 171 days.

This patent is subject to a terminal disclaimer.

(21) Appl. No.: 15/166,470

(22) Filed: May 27, 2016

(65) Prior Publication Data

US 2016/0274795 A1  Sep. 22, 2016

Related U.S. Application Data

(63) Continuation of application No. 14/175,181, filed on Feb. 7, 2014, now Pat. No. 9,354,979.

(51) Int. Cl.
  *G06F 3/06* (2006.01)
  *G06F 11/14* (2006.01)
  *G06F 11/20* (2006.01)

(52) U.S. Cl.
  CPC ............. *G06F 3/065* (2013.01); *G06F 3/067* (2013.01); *G06F 3/0619* (2013.01);
  (Continued)

(58) Field of Classification Search
  CPC .......... G06F 3/06; G06F 3/0614; G06F 11/20
  See application file for complete search history.

(56) References Cited

U.S. PATENT DOCUMENTS 6,154,852 A  11/2000  Amundson et al.
6,505,216 B1  1/2003  Schutzman et al.
(Continued)

FOREIGN PATENT DOCUMENTS

CA  2384020 A1  11/2003
EP  0869439 A1  10/1998
(Continued)

OTHER PUBLICATIONS

"Asynchronous Remote Replication", http://www.datacore.com/Software/Features/List-of-Features/Asynchronous-Remote-Replication.aspx, retrieved from the internet on Nov. 26, 2013, 2 pages.
(Continued)

*Primary Examiner* — Ann J Lo
*Assistant Examiner* — Masud Khan
(74) *Attorney, Agent, or Firm* — Stephen R. Tkacs; Stephen J. Walder, Jr.; Robert M. Sullivan

(57) ABSTRACT

A mechanism is provided in a data processing system for asynchronous replication. The mechanism creates a record in a write log in a host computing device for a write command and marking the record as uncommitted. The mechanism maintains a copy of data to be written by the write command at the host computing device. The mechanism issues the write command from the host computing device to a primary storage controller at the primary storage site. Responsive to receiving an acknowledgement from the primary storage controller that the data have been written to the primary storage site, the mechanism marks the record as unreplicated. Responsive to receiving an acknowledgement from the primary storage controller that the data have been replicated to a secondary storage site, the mechanism erases the record in the write log and deleting the copy of data.

18 Claims, 4 Drawing Sheets

(52) U.S. Cl.
CPC .......... *G06F 3/0659* (2013.01); *G06F 3/0683* (2013.01); *G06F 11/1448* (2013.01); *G06F 11/1471* (2013.01); *G06F 11/2074* (2013.01); *G06F 2201/84* (2013.01)

(56) References Cited

U.S. PATENT DOCUMENTS

| | | | |
|---|---|---|---|
| 6,804,719 | B1 | 10/2004 | Cabrera et al. |
| 6,981,005 | B1 | 12/2005 | Cabrera et al. |
| 7,039,661 | B1 | 5/2006 | Ranade |
| 7,072,914 | B2 | 7/2006 | Cabrera et al. |
| 7,073,036 | B2 | 7/2006 | Furuya et al. |
| 7,103,740 | B1 | 9/2006 | Colgrove et al. |
| 7,178,055 | B2 | 2/2007 | Ji et al. |
| 7,234,077 | B2 | 6/2007 | Curran et al. |
| 7,340,492 | B2 | 3/2008 | Cabrera et al. |
| 7,398,365 | B1 | 7/2008 | Hardman |
| 7,620,843 | B2 | 11/2009 | Zohar et al. |
| 7,634,491 | B2 | 12/2009 | Cabrera et al. |
| 7,788,234 | B2 | 8/2010 | DePue et al. |
| 8,204,863 | B2 | 6/2012 | Sawdon et al. |
| 8,285,956 | B2 | 10/2012 | Ozdemir |
| 8,332,354 | B1 | 12/2012 | Chatterjee et al. |
| 8,341,115 | B1 | 12/2012 | Natanzon et al. |
| 8,387,026 | B1 | 2/2013 | Hundt et al. |
| 8,595,185 | B2 | 11/2013 | Hayardeny et al. |
| 8,639,655 | B2 | 1/2014 | Parkinson et al. |
| 2004/0260894 | A1 | 12/2004 | Keohane et al. |
| 2004/0267787 | A1 | 12/2004 | Huras et al. |
| 2004/0267822 | A1 | 12/2004 | Curran et al. |
| 2007/0294320 | A1 | 12/2007 | Yueh et al. |
| 2008/0010284 | A1 | 1/2008 | Beck |
| 2008/0177801 | A1 | 7/2008 | Garimella et al. |
| 2010/0211547 | A1 | 8/2010 | Kamei et al. |
| 2010/0287142 | A1 | 11/2010 | Wesener et al. |
| 2011/0153561 | A1 | 6/2011 | Sawdon et al. |
| 2012/0150799 | A1 | 6/2012 | Matsuzawa |
| 2012/0185433 | A1 | 7/2012 | Harris, Jr. et al. |
| 2012/0317353 | A1 | 12/2012 | Webman et al. |
| 2013/0042083 | A1 | 2/2013 | Mutalik et al. |

FOREIGN PATENT DOCUMENTS

| | | |
|---|---|---|
| EP | 1292893 B1 | 9/2008 |
| WO | WO 2007002397 A2 | 1/2007 |
| WO | WO 2007103289 A2 | 9/2007 |
| WO | WO 2011082138 A1 | 7/2011 |

OTHER PUBLICATIONS

Black, David L., "A Storage Menagerie: SANs, Fibre Channel, Replication and Networks", NANOG 51 Conference, Miami, FL, Jan. 30, 2011, http://www.nanog.org/meetings/nanog51/presentations/Sunday/NANOG51.Talk8.StorageMenagerie.pdf, 36 pages.

Feng, Dan et al., "High Performance Virtual Backup and Archive System", INSPEC/Springer-Verlag; vol. 3993, pp. 671-678, 2006.

Forman, George et al., "Scaling Up Text Classification for Large File Systems", ACM Digital Library, pp. 239-250; Aug. 24-27, 2008.

Green, Russell J. et al., "Designing a Fast, On-line Backup System for a Log-structured File System", INSPEC/DT Journal, vol. 8, No. 2, pp. 32-45, 1996.

IBM, "Importance Based Backups", ip.com/ibm tdb; Feb. 7, 2006.

Kaczmarski, M. et al., "Beyond backup toward storage management", IBM Corporation, IBM Systems Journal, vol. 42, No. 2, 2003, pp. 322-337.

Natanzon, Assaf et al., "Dynamic Synchronous/Asynchronous Replication", http://www.cs.bgu.ac.il/~ebachmat/dynamic-tos.pdf, Jun. 29, 2013, 16 pages.

Wang, Andy et al., "The Conquest File System: Better Performance Through a Disk/Persistent-RAM Hybrid Design", ACM Digital Library; vol. 2, No. 3, Aug. 2006, pp. 309-348.

U.S. Appl. No. 14/175,181, 2 pages.

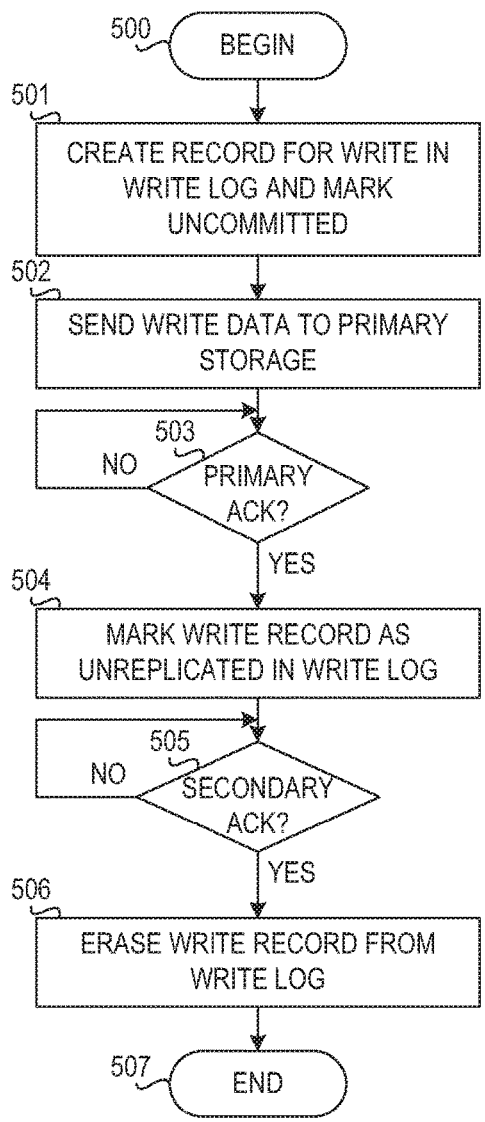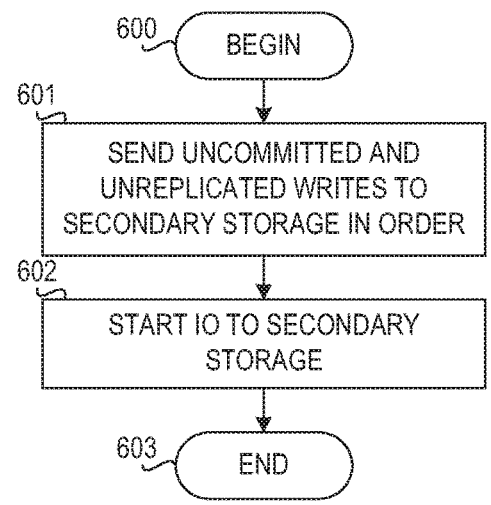

SERVER BASED DISASTER RECOVERY BY MAKING USE OF DUAL WRITE RESPONSES

BACKGROUND

The present application relates generally to an improved data processing apparatus and method and more specifically to mechanisms for server based disaster recovery by making use of dual write responses.

Replication works in two ways: synchronous and asynchronous. Block level replication happens between two storage controllers or storage virtualization appliances. Generally, a data center has a primary site and a secondary site, which is the disaster recovery site, for storing data. The primary site hosts the live data used by the servers and applications. A replication solution is implemented between the primary site and the secondary site. The replication enables failing over the access path to the replicated storage at the secondary site in response to failure of the primary storage.

Asynchronous replication does not guarantee availability of the most recent data. Generally, data loss is encountered when failing over to the secondary site. Recovery Point Objective (RPO) specifies the amount of data that the secondary site has and how much has been lost. The lower the RPO, the less the data loss at the time of a failover.

One solution for reducing RPO is to increase the frequency of the data copy from the primary site to the secondary site. The disadvantage of this solution is that the primary is busy for more time in copying data, and the host to primary communication suffers.

Another solution for reducing RPO is to procure high end storage at the primary site, similar high end storage at the secondary site, high performing switches, and high bandwidth links between the primary site and the secondary site. All of this requires significant investment, which is not an economical solution.

Yet another solution for reducing RPO is to change the replication method from asynchronous to synchronous. This will have multiple new requirements, such as an increased bandwidth link between the primary site and the secondary site, and will add latency to the server input/output (IO), because the server must wait for an acknowledgement (ACK) from both the primary site and the secondary site for each write.

Another solution for reducing RPO is to configure the volume management software on the server to create a mirror for the logical unit (LUN) on two different enclosures. The advantage in this case is high availability in case of storage enclosure breakdown. However, as a full copy is maintained on two enclosures, space efficiency is significantly lower.

SUMMARY

In one illustrative embodiment, a method, in a data processing system, is provided for asynchronous replication. The method comprises creating a record in a write log in a host computing device for a write command and marking the record as uncommitted. The method further comprises maintaining a copy of data to be written by the write command at the host computing device. The method further comprises issuing the write command from the host computing device to a primary storage controller at the primary storage site. The method further comprises responsive to receiving an acknowledgement from the primary storage controller that the data have been written to the primary storage site, marking the record as unreplicated. The method further comprises responsive to receiving an acknowledgement from the primary storage controller that the data have been replicated to a secondary storage site, erasing the record in the write log and deleting the copy of data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is a flowchart illustrating operation of a server or host for asynchronous replication using dual write responses in accordance with an illustrative embodiment;

FIG. 6 is a flowchart illustrating a mechanism for disaster recovery in accordance with an illustrative embodiment;

DETAILED DESCRIPTION

Figure 1:
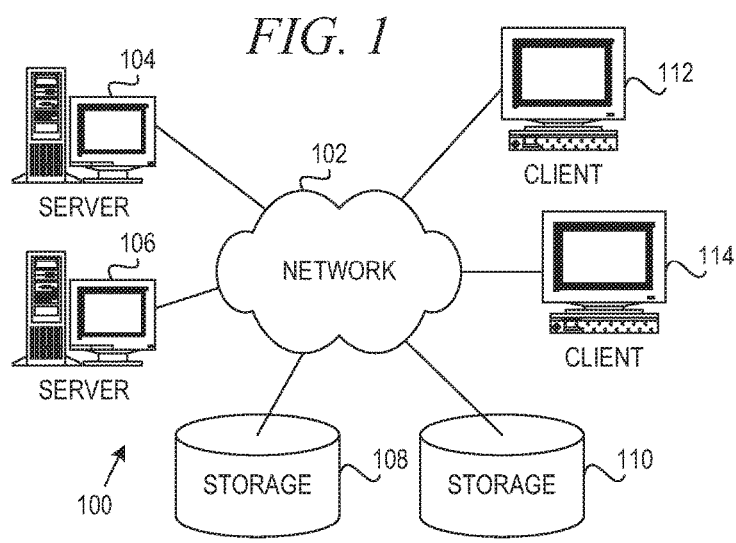
FIG. 1 is an example diagram of a distributed data processing system in which aspects of the illustrative embodiments may be implemented.

The illustrative embodiments provide mechanisms for sever based disaster recovery by making use of dual write responses. In one embodiment, a mechanism stores a log of write commands issued by the server on the server itself. For every new write issued by the host, the mechanism creates a record with payload in the server. The mechanism invalidates or removes the record in response to receiving confirmation from the primary storage that the write has been replicated to the secondary storage. At any point in time, the log includes records of: 1. writes not acknowledged by the primary and secondary storage, and 2. writes acknowledged by the primary storage but not replicated to the secondary storage. Thus, in case of a disaster where the server does not fail but the primary storage has become unusable, the server maintains a copy of the writes that have not been replicated to the secondary storage. The mechanism then replays this set of commands on the secondary storage. In this way, loss of the unreplicated data is prevented.

In another illustrative embodiment, a mechanism creates two write commands for every write operation. The first write command works as usual and receives a response from primary storage controller when data are written to the primary storage. The second write, the tracker-write command, is cross-linked to the first write command. The server receives a response from the tracker-write command when the data blocks are written to the secondary storage asynchronously.

The mechanism cross-links the two write command in one of several ways. In one example, the mechanism may use a command tag that is identical for the two commands. This allows the host and the storage controller identify that the commands are linked commands for a single data write operation. In another example, the payload in the second write command contains the unique identifier for the referenced write command, and the second write command is to be written to the same location of the logical unit (LUN) as was written by the first write command.

Only the first write command contains the data to be written. The second write command does not transfer any data from the host to the storage. Instead, the second write command is a special write command that is linked to the first write command and is used by the host to determine when the data have been written to secondary storage. In response to the host determining the data have been committed to secondary storage, the mechanism frees the resources associated with the second command.

With the illustrative embodiments, a theoretical RPO of zero can be achieved without incurring costs of synchronous data replication. However, the server incurs a cost for storing writes in server storage. Also, the mechanisms of the illustrative embodiments can achieve a lower RPO even using a lower bandwidth link between primary storage and secondary storage. In this case, however, the amount of storage space required on the server increases. If a solid-state disk (SSD) is deployed on the server to record the write log, the mechanisms of the illustrative embodiments experience minimal additional latency. Furthermore, the mechanisms of the illustrative embodiments can be implemented easily without changing the storage driver or protocol.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

Figure 2:
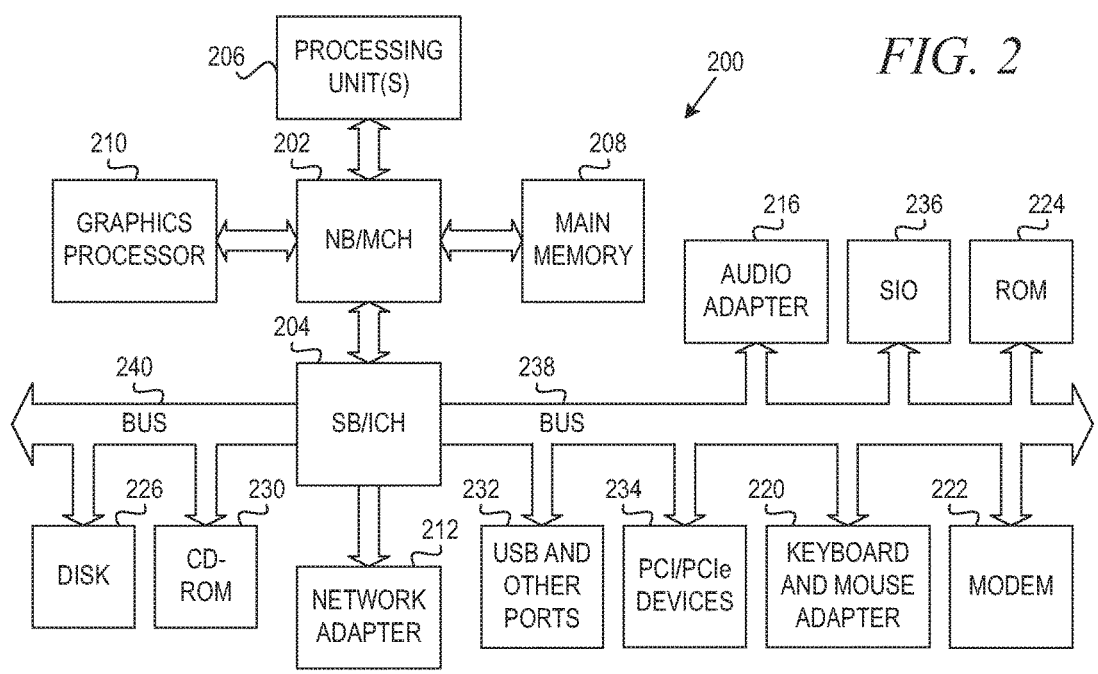
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage units 108, 110. In addition, clients 112, 114 are also connected to network 102. These clients 112, 114 may be, for example, personal computers, network computers, or the like. In the depicted example, server 104 provides data, such as boot files, operating system images, and applications to the clients 112, 114. Clients 112, 114 are clients to server 104 in the depicted example. Distributed data processing system 100 may include additional servers, clients, and other devices not shown.

In the depicted example, distributed data processing system 100 is a storage area network with network 102 representing a collection of switches and/or routers that use the Small Computer Systems Interface (SCSI) protocol to communicate and perform access operations. Alternatively, server 104, for example, may be directly connected (e.g., via a serial attached SCSI (SAS) cable) to storage unit 108, which is directly connected to storage unit 110. In this embodiment, server 104 issues SCSI commands to read or write information to storage units 108, which replicates writes to storage unit 110. In case of disaster, server 104 may fail over access to storage unit 110.

In accordance with the illustrative embodiments, storage units 108, 110 are separate storage enclosures. Each storage unit 108, 110 includes a storage controller and one or more storage devices, such as hard disk drives, solid state drives, or the like. Storage units 108, 110 may use various redundant array of independent disks (RAID) techniques for reliably and efficiently storing data to the storage devices.

In accordance with the illustrative embodiments, server 104 performs writes to primary storage 108, and storage 108 replicates the writes to secondary storage 110. The illustrative embodiments provide mechanisms for sever based disaster recovery by making use of dual write responses. In one embodiment, a mechanism stores a log of write commands issued by the server on the server itself. For every new write issued by the host, the mechanism creates a record with payload in the server. The mechanism invalidates or removes the record in response to receiving confirmation from the primary storage that the write has been replicated to the secondary storage.

In another illustrative embodiment, a mechanism creates two write commands for every write operation. The first write command works as usual and receives a response from primary storage controller when data are written to the primary storage. The second write, the tracker-write command, is cross-linked to the first write command. The server receives a response from the tracker-write command when the data blocks are written to the secondary storage asynchronously.

In another example embodiment, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
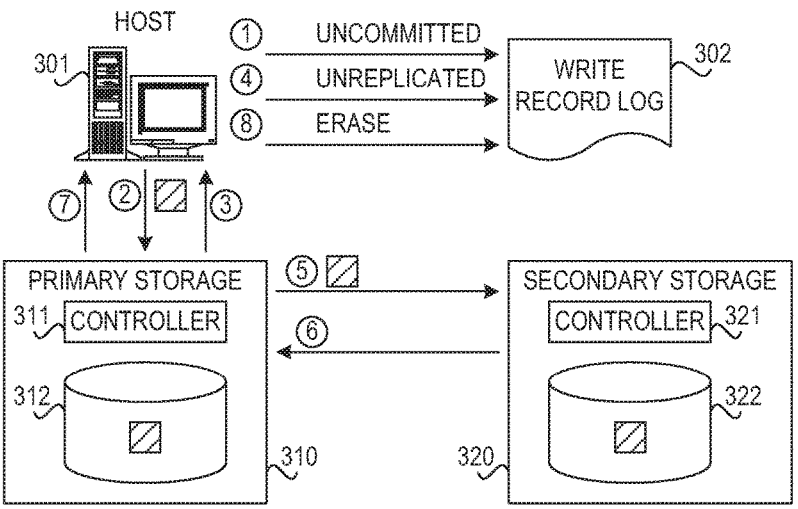
FIG. 3 illustrates asynchronous replication using dual write responses in accordance with an illustrative embodiment.

FIG. 3 illustrates asynchronous replication using dual write responses in accordance with an illustrative embodiment. Host 301 initiates a write operation to write data to primary storage 310. Host 301 creates a record for the write in write record log 302 with a copy of the data to be written (step 1). Host 301 marks the write as "uncommitted" in write record log 302.

Host 301 then sends the write to primary storage 310 (step 2), which includes storage controller 311 and at least one storage device 312. Host 301 sends the write command to the primary storage controller 311, which receives the write command and commits the write data to storage device 312. In response to committing the data, primary storage controller 311 returns an acknowledgement to host 301 (step 3).

In response to receiving the acknowledgement, host 301 marks the write as "unreplicated" in write record log 302 (step 4).

Primary storage controller 311 then sends the write to secondary storage 320 for replication (step 5). Secondary storage 320 includes storage controller 321 and at least one storage device 322. Secondary storage controller 321 receives the write from primary storage controller 311 and, in response to committing the data to storage device 322, returns an acknowledgement to primary storage controller 311 (step 6), which in turn sends an acknowledgement to host 301 (step 7). In response to receiving the acknowledgement that the data have been replicated to secondary storage 320, host 301 erases the record for the write in write record log 302 (step 8).

Therefore, write record log 302 stores two types of write records: uncommitted data and unreplicated data. The uncommitted data are not ascertained to have been written on primary storage 310. In case of disaster, higher layer applications believe these data are written to storage, but the data are actually not yet committed to primary storage 310.

The unreplicated data are ascertained to have been written to primary storage 310 but are not ascertained to have been replicated to secondary storage 320. There is a possibility that the data are written to secondary storage 320, but host 301 has not received acknowledgement that the data are replicated. Rewriting the data is not expected to risk the integrity of the data if the data are written to secondary storage 320 in the same order the data were written to primary storage 310.

The illustrative embodiments provide server based disaster recovery if primary storage 310 becomes unavailable to the server while secondary storage 320 and host 301 remain available. In this case, if primary storage 310 becomes unavailable, host 301 rewrites uncommitted and unreplicated data from write record log 302 to secondary storage 320. Data that are ascertained to be replicated to secondary storage 320 have been erased from write record log 302.

Host 301 maintains the order of the writes in write record log 302 and rewrites the data to secondary storage 320 in the order the data were written to primary storage 310. Host 301 can then start IO to secondary storage 320 without data loss. RPO for the asynchronous replication solution of the illustrative embodiment is zero, as no data are lost. The data become inaccessible only for the time required to ensure connectivity from host 301 to secondary storage 320 and for replaying the write commands from write record log 302 to secondary storage 320.

Figure 4:
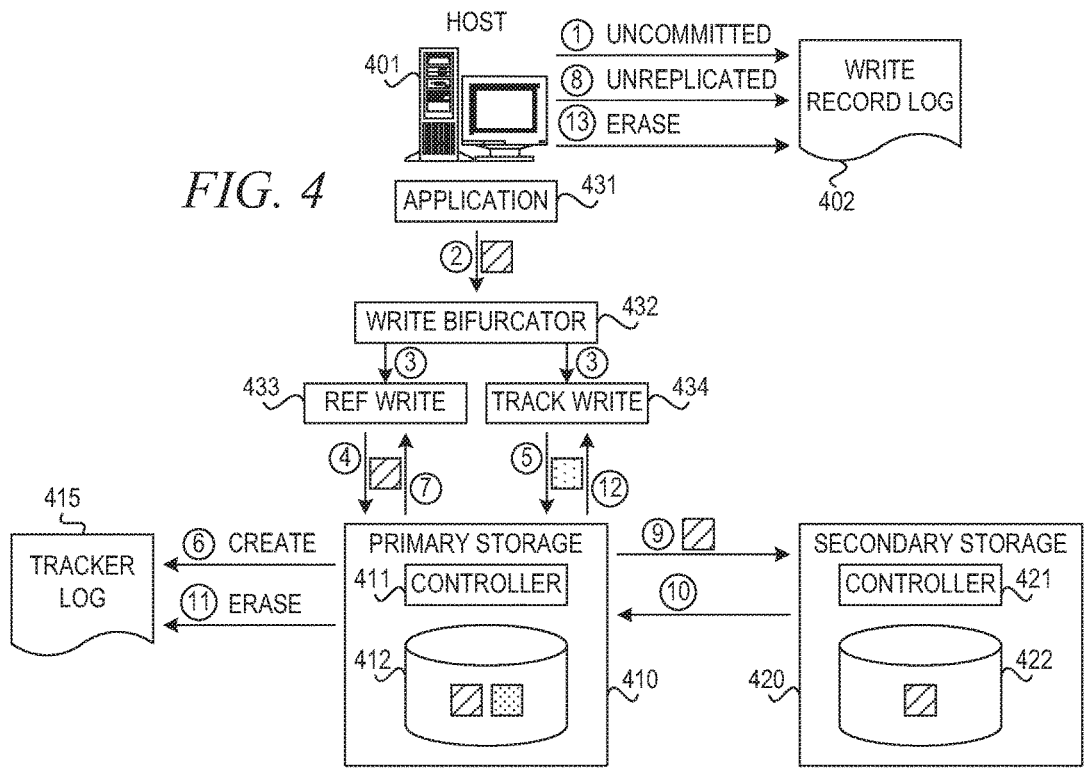
FIG. 4 illustrates asynchronous replication using dual write commands in accordance with an illustrative embodiment.

FIG. 4 illustrates asynchronous replication using dual write commands in accordance with an illustrative embodiment. Host 401 initiates a write operation to write data to primary storage 410. Host 401 creates a record for the write in write record log 402 with a copy of the data to be written (step 1). Host 401 marks the write as "uncommitted" in write record log 402.

The illustrative embodiment provides a mechanism to create two writes for every write operation. The first write follows the usual workflow and results in an acknowledgement response from the primary storage controller when data is written to primary storage. The second write command, which is a tracker for the first write, is responded by the primary storage controller only when the data blocks written by the first write command are replicated to the secondary storage asynchronously. To effect this functionality, small software applications are provided on the server and the primary storage controller.

An application 431 running on host 401 submits the write to write bifurcator 432 (step 2). The write bifurcator 432 creates two write commands: a referenced write command 433 and a tracker-write command 434 (step 3). Referenced write command 433 contains the data to be written to primary storage 410. Tracker write command 434 does not contain the data but has a reference to write command 433.

Host 401 then issues referenced write command 433 to primary storage 410 (step 4) and issues tracker-write command 434 to primary storage 410 (step 5). Host 401 issues the referenced write command 433 and the tracker-write command 434 to primary storage controller 411. In response to receiving tracker-write command 434, primary storage controller 411 adds an entry to tracker log 415, which maintains a list of tracker-write commands that are not yet acknowledged to be written to secondary storage 420 by the primary storage controller 411 (step 6). Host 401 exchanges the association between write command 433 and tracker-write command 434 with primary storage controller 411, as described above.

In response to committing the data to storage device 412, primary storage controller 411 returns an acknowledgement to host 401 (step 7). In response to receiving the acknowledgement, host 401 marks the write as "unreplicated" in write record log 402 (step 8).

Primary storage controller 411 then sends the write to secondary storage controller 421 for replication (step 9). In response to committing the data to storage device 422, secondary storage controller 421 returns an acknowledgement to primary storage controller 411 (step 10). In response to receiving the acknowledgement, primary storage controller 411 erases the entry in tracker log 415 for the tracker-write (step 11). Primary storage controller 411 then sends an acknowledgement to host 401 (step 12). In response to receiving the acknowledgement that the data have been replicated to secondary storage 420, host 401 erases the record for the write in write record log 402, freeing the storage space for the copy of the write data (step 13).

The application on the primary storage controller 411 identifies the tracker-write command and logs the command to be later acknowledged back to the server. The application on the primary storage controller also accepts the association between the tracker-write command and the referenced write command from the server side application. The application identifies the referenced write command and links the tracker-write command with the data blocks of the referenced write. Once all data blocks referenced by the tracker-write command are written to secondary storage 420, the application on the primary storage controller 411 issues an acknowledgement for the tracker-write command to the server side application 431. Also, once acknowledged, the application erases the tracker-write command from the local tracker log 415.

The asynchronous replication technology in this case does not need any alteration. The illustrative embodiment provides a mechanism to attain zero RPO in the event of a disaster where the primary storage 410 becomes inaccessible or destroyed by natural calamity. In such a disaster, the server maintains a record of all writes that are not yet to be replicated and replays the write commands, along with data, from the write record log to secondary storage 420. This makes the secondary storage 420 current with primary storage 410 in absence of the primary storage controller. Once the replay completes successfully, the server can continue application IO with secondary storage 420, which may now be the primary storage, as usual.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 5 is a flowchart illustrating operation of a mechanism for asynchronous replication using dual write responses in accordance with an illustrative embodiment. Operation begins for a given write by a server or host to primary storage (block 500). The mechanism creates a record for the write, with data, in a write log and marks the write as uncommitted (block 501). Uncommitted data are not ascertained to have been written to primary storage. In case of disaster, higher layer applications assume such uncommitted data have been written to storage; however, it is possible the data have not been written, because the server or host has not yet received an acknowledgement.

The mechanism then sends the write data to the primary storage controller (block 502). The mechanism then determines whether an acknowledgement has been received from the primary storage controller indicating the data have been written to primary storage (block 503). If an acknowledgement has not been received from the primary storage controller, operation returns to block 503 until the primary storage controller acknowledges the write data have been written to primary storage.

If the mechanism determines an acknowledgement has been received indicating the write data have been written to primary storage in block 503, the mechanism marks the record as unreplicated in the write log (block 504). Unreplicated data are ascertained to have been written to primary storage but are not ascertained to have been replicated to secondary storage. There is a possibility that the data are written to secondary storage but the server or host has not yet received an acknowledgement indicating the data have been replicated. Rewriting unreplicated data is not expected to risk the integrity of the data assuming the data are written in the same order the data were written to primary storage. The mechanism then determines whether an acknowledgement has been received from the primary storage controller indicating the data have been written to secondary storage (block 505). If the mechanism has not received an acknowledgement indicating the data have been written to secondary storage, operation returns to block 505 until the primary storage controller acknowledges the write data have been written to secondary storage.

If the mechanism determines an acknowledgement has been received indicating the write data have been replicated to secondary storage in block 505, the mechanism erases the record for the write from the write log (block 506). Thereafter, operation ends (block 507).

FIG. 6 is a flowchart illustrating a mechanism for disaster recovery in accordance with an illustrative embodiment. Operation begins in response to the server or host determining primary storage has become unavailable while secondary storage remains available (block 600). The mechanism sends uncommitted and unreplicated writes from the write log to the secondary storage controller in the same order the writes were sent to primary storage (block 601). The mechanism may retain entries in the write log to replay the uncommitted writes to primary storage in response to primary storage becoming available again. Next, the mechanism starts directing input/output (IO) operations to the secondary storage controller (block 602). Thereafter, operation ends (block 603).

Thus, the server or host fails over to secondary storage with zero data loss. Theoretically, RPO for the asynchronous replication solution of the illustrative embodiment is zero because no data are lost.

Figure 7:
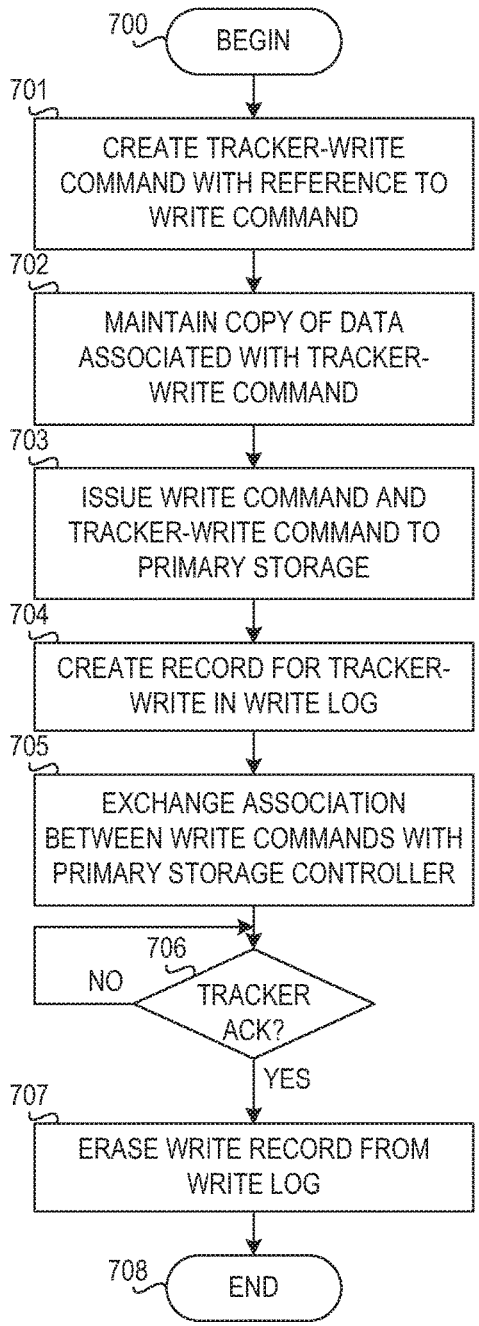
FIG. 7 is a flowchart illustrating operation of a mechanism in a server or host for asynchronous replication using dual write commands in accordance with an illustrative embodiment.

FIG. 7 is a flowchart illustrating operation of a mechanism in a server or host for asynchronous replication using dual write commands in accordance with an illustrative embodiment. Operation begins for a given write by a server or host to primary storage (block 700). The mechanism then creates a tracker-write command with reference to the write command (block 701). The tracker-write command does not contain data but contains a reference to the original write command; therefore, the mechanism maintains a copy of the data associated with the tracker-write command (block 702). The tracker-write command is cross-linked to the original write command such that the primary storage responds to the tracker-write command in response to replicating the original rite command to secondary storage.

The mechanism cross-links the two commands in one of two ways. In one example embodiment, the mechanism uses a command tag that is identical for the two commands. The command tag allows the host and storage to identify that the write commands are linked commands for a single data write. In another example embodiment, the payload of the tracker-write command contains the unique identifier for the referenced write command and is written to the same local of the LUN as the original write command. The tracker-write command is a special command that is used by the host to determine when the data have been written to secondary storage. Once the host receives acknowledgement that the data have been replicated to secondary storage, the host can free any resources associated with the tracker-write command.

The mechanism then issues the write command and the tracker-write command to the primary storage controller (block 703). The mechanism creates a record for the tracker-write command in the write log (block 704). The mechanism then exchanges the association between the write command the tracker-write command with the primary storage controller (block 705).

The mechanism then determines whether an acknowledgement has been received from the primary storage controller for the tracker-write command indicating the data have been written to secondary storage (block 706). If the mechanism has not received an acknowledgement for the tracker-write command, operation returns to block 706 until the primary storage controller acknowledges the write data have been written to secondary storage. If the mechanism determines an acknowledgement has been received for the tracker-write command indicating the write data have been replicated to secondary storage in block 706, the mechanism erases the record for the tracker-write command, as well as the data associated with the command, from the write log (block 707). Thereafter, operation ends (block 708).

Figure 8:
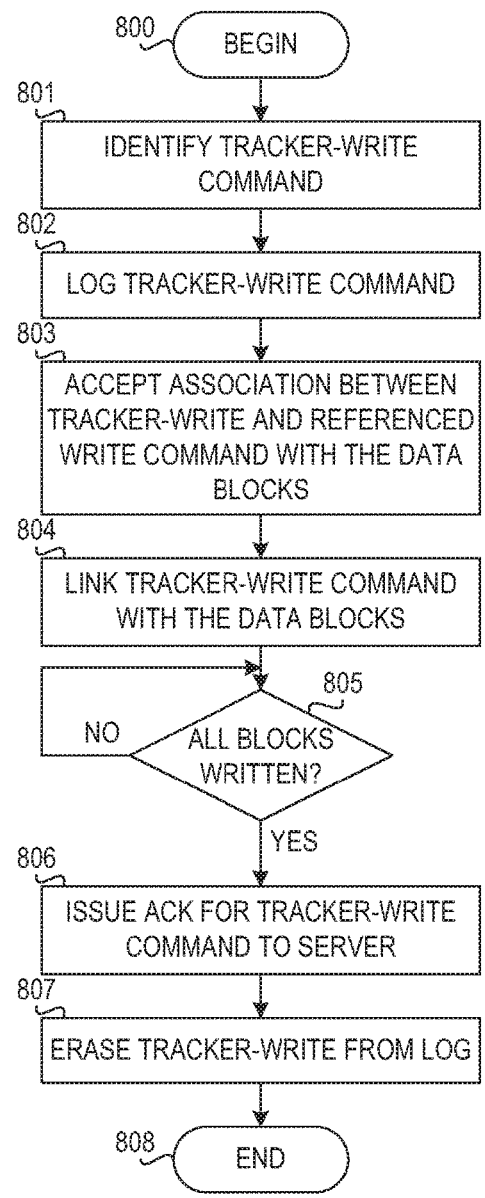
FIG. 8 is a flowchart illustrating operation of a mechanism in a primary storage controller for asynchronous replication using dual write commands in accordance with an illustrative embodiment.

FIG. 8 is a flowchart illustrating operation of a mechanism in a primary storage controller for asynchronous replication using dual write commands in accordance with an illustrative embodiment. Operation begins (block 800), and the mechanism identifies a received tracker-write command (block 801) and logs the tracker-write command (block 802). The mechanism accepts the association between the tracker-write command and the referenced write command with the data blocks received from the server or host (block 803).

The mechanism then determines the referenced write command and links the tracker-write command with the data blocks (block 804). The mechanism determines whether all data blocks associated with the tracker-write command have been written to secondary storage (block 805). If all data blocks have not been written to secondary storage, operation returns to block 805 until all blocks have been replicated. If the mechanism determines all data blocks have been written to secondary storage in block 805, the mechanism issues an acknowledgement for the tracker-write command to the server (block 806). Then, the mechanism erases the entry for the tracker-write command from the log (block 807), and operation ends (block 808).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a host computing device, causes the host computing device to:
    maintain a copy of data to be written by a write command to write data to a primary storage site at the host computing device;
    issue the write command from the host computing device to a primary storage controller at the primary storage site;
    create a tracker command having a reference to the write command;
    issue the tracker command from the host computing device to the primary storage controller;
    exchange an association between the write command and the tracker command with the primary storage controller, wherein the primary storage controller creates a record in a local log at the primary storage site for the tracker command and wherein the primary storage controller returns an acknowledgement associated with the tracker command responsive to the data being replicated to the secondary storage site; and
    responsive to receiving an acknowledgement from the primary storage controller that the data have been replicated to a secondary storage site, delete the copy of data in the host computing device.

2. The computer program product of claim 1, wherein the computer readable program further causes the computing device to:
    create a record in a write log in the host computing device for a write command and mark the record as uncommitted;
    responsive to receiving an acknowledgement from the primary storage controller that the data have been written to the primary storage site, mark the record as unreplicated; and
    responsive to the primary storage site no longer being available, replay write commands in the write log to a secondary storage controller at the secondary storage site in a same order the write commands were issued to the primary storage controller.

3. The computer program product of claim 2, wherein the computer readable program further causes the computing device to:
    responsive to replaying the write commands in the write log to the secondary storage controller, issue subsequent write commands to the secondary storage controller.

4. The computer program product of claim 1, wherein the primary storage controller erases the record in the local log responsive to the data being replicated to the secondary storage site.

5. The computer program product of claim 1, wherein the write command and the tracker command have identical command tags.

6. The computer program product of claim 1, wherein a payload of the tracker command contains a unique identifier of the write command and wherein the tracker command is written to a same location as the write command.

7. An apparatus comprising:
    a processor; and
    a memory coupled to the processor, wherein the memory comprises instructions which, when executed by the processor, cause the processor to:
    maintain a copy of data to be written by a write command to write data to a primary storage site at the host computing device;
    issue the write command from the host computing device to a primary storage controller at the primary storage site;
    create a tracker command having a reference to the write command;
    issue the tracker command from the host computing device to the primary storage controller;
    exchange an association between the write command and the tracker command with the primary storage controller, wherein the primary storage controller creates a record in a local log at the primary storage site for the tracker command and wherein the primary storage controller returns an acknowledgement associated with the tracker command responsive to the data being replicated to the secondary storage site; and
    responsive to receiving an acknowledgement from the primary storage controller that the data have been replicated to a secondary storage site, delete the copy of data in the host computing device.

8. The apparatus of claim 7, wherein the instructions further cause the processor to:
create a record in a write log in the host computing device for a write command and mark the record as uncommitted;
responsive to receiving an acknowledgement from the primary storage controller that the data have been written to the primary storage site, mark the record as unreplicated; and
responsive to the primary storage site no longer being available, replaying write commands in the write log to a secondary storage controller at the secondary storage site in a same order the write commands were issued to the primary storage controller.

9. The apparatus of claim 8, wherein the instructions further cause the processor to:
responsive to replaying the write commands in the write log to the secondary storage controller, issue subsequent write commands to the secondary storage controller.

10. The apparatus of claim 7, wherein the primary storage controller erases the record in the local log responsive to the data being replicated to the secondary storage site.

11. The apparatus of claim 7, wherein the write command and the tracker command have identical command tags.

12. The apparatus of claim 7, wherein a payload of the tracker command contains a unique identifier of the write command and wherein the tracker command is written to a same location as the write command.

13. A method, in a data processing system, for asynchronous replication, the method comprising:
maintaining a copy of data to be written by a write command to write data to a primary storage site at the host computing device;
issuing the write command from the host computing device to a primary storage controller at the primary storage site;
creating a tracker command having a reference to the write command;
issuing the tracker command from the host computing device to the primary storage controller;
exchanging an association between the write command and the tracker command with the primary storage controller, wherein the primary storage controller creates a record in a local log at the primary storage site for the tracker command and wherein the primary storage controller returns an acknowledgement associated with the tracker command responsive to the data being replicated to the secondary storage site; and
responsive to receiving an acknowledgement from the primary storage controller that the data have been replicated to a secondary storage site, deleting the copy of data in the host computing device.

14. The method of claim 13, further comprising:
creating a record in a write log in the host computing device for a write command and mark the record as uncommitted;
responsive to receiving an acknowledgement from the primary storage controller that the data have been written to the primary storage site, marking the record as unreplicated; and
responsive to the primary storage site no longer being available, replaying write commands in the write log to a secondary storage controller at the secondary storage site in a same order the write commands were issued to the primary storage controller.

15. The method of claim 14, further comprising:
responsive to replaying the write commands in the write log to the secondary storage controller, issuing subsequent write commands to the secondary storage controller.

16. The method of claim 13, wherein the primary storage controller erases the record in the local log responsive to the data being replicated to the secondary storage site.

17. The method of claim 13, wherein the write command and the tracker command have identical command tags.

18. The method of claim 13, wherein a payload of the tracker command contains a unique identifier of the write command and wherein the tracker command is written to a same location as the write command.

* * * * *